United States Patent
Nakajima

[19]

[11] Patent Number: 6,006,854
[45] Date of Patent: Dec. 28, 1999

[54] ELECTRIC POWER STEERING APPARATUS

[75] Inventor: Terukazu Nakajima, Yamatotakada, Japan

[73] Assignee: Koyo Seiko Co., Ltd, Osaka, Japan

[21] Appl. No.: 09/116,085

[22] Filed: Jul. 15, 1998

[30] Foreign Application Priority Data

Jul. 29, 1997 [JP] Japan ................................ 9-203541

[51] Int. Cl.[6] ................................................ B62D 5/04
[52] U.S. Cl. ........................................ 180/446; 180/444
[58] Field of Search ................................ 180/446, 444, 180/443

[56] References Cited

U.S. PATENT DOCUMENTS

| 5,492,191 | 2/1996 | Birsching | 180/79.1 |
| 5,503,241 | 4/1996 | Hiraiwa | 180/79.1 |
| 5,511,823 | 4/1996 | Yamaguchi et al. | 280/777 |
| 5,732,790 | 3/1998 | Endo et al. | 180/444 |

FOREIGN PATENT DOCUMENTS

| 748 735 A | 4/1986 | European Pat. Off. . |
| 08 142885 | 6/1996 | Japan . |
| 2603479 | 1/1997 | Japan . |
| 2 164 906 | 4/1986 | United Kingdom . |
| WO 89 02387 | 3/1989 | WIPO . |

*Primary Examiner*—Lanna Mai
*Assistant Examiner*—Jeff Restifo
*Attorney, Agent, or Firm*—Darby & Darby

[57] ABSTRACT

An electric power steering apparatus which includes: an input shaft connected to a steering wheel; a torque sensor mechanism having a torque sensor which detects a steering torque on the basis of a relative displacement of the input shaft and the output shaft connected to the input shaft via a torsion bar; and a reduction mechanism which reduces a rotation of a steering assisting electric motor driven on the basis of a result detected by the torque sensor and transmits it to the output shaft. The torque sensor mechanism is arranged to the steering mechanism side from the reduction mechanism, so that an energy absorption stroke can be further made long without varying a mount point of the electric motor and a column mount length.

5 Claims, 5 Drawing Sheets

ELECTRIC POWER STEERING APPARATUS

BACKGROUND OF THE INVENTION

The present invention relates to an electric power steering apparatus which uses an electric motor as a generating source for steering assisting force.

Steering of automobiles is carried out in a manner that a rotating operation of a steering wheel located in a saloon is transmitted to a steering mechanism located outside the saloon in order to steer traveling wheels (front wheels, in general).

FIG. 1 is a cross sectional view showing a conventional electric power steering apparatus. As shown in FIG. 1, the electric power steering apparatus for automobiles includes an input shaft mechanism section HI, a torque sensor mechanism section H2 and a reduction mechanism section H3.

The input shaft mechanism section H1 has an input shaft 100 connected to a steering wheel 300. The torque sensor mechanism section H2 has a torque sensor 202 which detects a steering torque on the basis of a relative displacement of the input shaft 100 and an output shaft 201 connected to the input shaft 100 via a torsion bar 200. The reduction mechanism section H3 reduces a rotation of a steering auxiliary electric motor M (hereinafter, referred to simply as "motor M") driven on the basis of the detected result of the torque sensor 202 by means of a reduction mechanism 203, and transmits it to the output shaft 201. The rotation of the motor M helps an operation of a steering mechanism 400 in accordance with a rotation of a steering wheel 300 so that a driver's steering load can be reduced.

Further, in order to improve a collision safety performance, the input shaft 100 includes a first input shaft 101, a second input shaft 102, a shearing pin 103; 103 made of a synthetic resin, a wave form energy absorbing plate 106, and a third cylindrical input shaft 104. The first input shaft 101 has one end portion connected to the steering wheel 300 and a fitting cylindrical portion 105 at the other end portion thereof. The second input shaft 102 has one end portion which is fitted into the fitting cylindrical portion 105 so as to be slidable, and the other end portion connected to the torsion bar 200. The shearing pin 103; 103 is interposed between the first input shaft 101 and the second input shaft 102, and is ruptured by a longitudinal impact energy generated when a driver hits on the steering wheel 300 by a frontal (head-on) collision of automobiles. The energy absorbing plate 106 absorbs an impact energy by a relative movement of the first input shaft 101 to the second input shaft 102. The third input shaft 104 is connected to the other end portion of the second input shaft 102.

FIG. 2 is a view to explain a layout configuration of the conventional electric power steering apparatus. In the electric power steering apparatus constructed as described above, as shown in FIG. 2, the layout is made in a manner that the input shaft mechanism section H1, the torque sensor mechanism section H2, the reduction mechanism section H3, a steering joint section H4 provided between the reduction mechanism section H3 and the steering mechanism 400 and a pinion shaft section H5 are arranged in the above named order from the steering wheel 300 side. In other words, the layout is made in a manner that the torque sensor mechanism section H2 is arranged between the input shaft mechanism section H1 and the reduction mechanism section H3.

By the way, in the conventional electric power steering apparatus constructed as described above, in the case where an impact force is applied to the steering wheel 300 due to the frontal collision of automobiles, the shearing pin 103; 103 is raptured, and the first input shaft 101 slides in the longitudinal direction with respect to the second input shaft 102 so that the impact stress can be absorbed by means of the energy absorbing plate 106. In recent years, in order to further improve collision safety performance, it has been requested to make long an energy absorption stroke S (hereinafter, referred simply to as "stroke S").

In order to make long the stroke S, the entire length of the input shaft mechanism section H1 is made long, and further, there is a need of making long a relative slidable length of the first input shaft 101 and the second input shaft 102 in the case where the shearing pin 103; 103 is broken, that is, the aforesaid stroke S.

However, the conventional electric power steering apparatus is constructed in a manner that the input shaft mechanism section H1, the torque sensor mechanism section H2, the reduction mechanism section H3 and the steering joint section H4 are arranged in the named order from the steering wheel 300 side. For this reason, there is a limit in the layout to further make long the stroke S.

More specifically, the electric power steering apparatus has the layout configuration as shown in FIG. 2. However, in response to user's instruction and request, it is impossible to change a coordinate 01 which is a connecting point of the steering wheel 300 and the first input shaft 101, a coordinate 02 which is a connecting point of the output shaft 201 and an upper end of the steering joint, a coordinate 03 which is a connecting point of a lower end of the steering joint and a pinion shaft, and a coordinate 04 which is a center in engagement of a pinion of the pinion shaft and a rack. Further, in response to user's instruction and request, it is impossible to change a column mount length L between the coordinates 01 and 02 for attaching the input shaft mechanism section H1, the torque sensor mechanism section H2 and the reduction mechanism section H3 to a vehicle body, and to change a mount point of the motor M. For this reason, a longitudinal dimension is inevitably set in the input shaft mechanism section Hi, the torque sensor mechanism section H2 and the reduction mechanism section H3. Thus, in the layout configuration as shown in FIG. 2, in the case where the study is made so that the maximum stroke S is obtained in the limited longitudinal dimension of the input shaft mechanism section H1 taking the column mount length L and the mount point of the motor M instructed and requested by user into consideration, it is difficult to further make long the stroke S.

BRIEF SUMMARY OF THE INVENTION

The present invention has been made to solve the aforesaid problem in the prior art. An object of the present invention is to provide an electric power steering apparatus which has a layout configuration that a torque sensor mechanism section is arranged to a steering mechanism side from a reduction mechanism section, and can further make long an energy absorption stroke without changing a mount point of a steering assisting electric motor and a column mount length.

To achieve the above object, the present invention provides an electric power steering apparatus, comprising: an input shaft connected to a steering wheel; a torque sensor mechanism having a torque sensor which detects a steering torque on the basis of a relative displacement of the input shaft and the output shaft connected to the input shaft via a torsion bar; and a reduction mechanism which reduces a rotation of a steering assisting electric motor driven on the basis of a detected result of the torque sensor and transmits it to the output shaft, and thereby, assisting an operation of the steering mechanism connected to the output shaft, wherein the torque sensor mechanism is arranged to the steering mechanism side from the reduction mechanism.

Therefore, the layout configuration is made in a manner that the torque sensor mechanism is arranged to the steering mechanism side from the reduction mechanism section, so that an energy absorption stroke can be further made long without varying a mount point of the steering assisting electric motor and a column mount length.

Further, the present invention provides the electric power steering apparatus, wherein the reduction mechanism includes: a gear which is provided on the output shaft, and has an insertion hole penetrating in the thickness direction thereof; and an input transmission member which is inserted into the insertion hole of the gear so as to transmit a rotation of the input shaft to the torque sensor.

Further, the present invention provides the electric power steering apparatus, wherein the reduction mechanism includes: a disk-shaped gear which is provided on the output shaft, and has a plurality of insertion holes penetrating in the thickness direction thereof and formed along a circumferential direction at equal intervals; and a plurality of input transmitting rods which are inserted into the insertion holes of the gear, and connect the input shaft and the torque sensor.

Therefore the gear of the reduction mechanism section is provided with the insertion hole penetrating in the thickness direction thereof, and the input transmission member is inserted into the insertion hole so that the rotation of the input shaft is transmitted to the torque sensor. Thus, it is possible to use the torque sensor having the substantially same construction as the conventional torque sensor.

Further, the present invention provides the electric power steering apparatus, wherein the reduction mechanism includes: a pinion gear which is connected to an output shaft of the electric motor, and meshes with the gear.

Therefore, the output shaft connected to the input shaft via the torsion bar is provided with the gear, so that the gear can be rotated and driven with a simple construction.

The above and further objects and features of the invention will more fully be apparent from the following detailed description with accompanying drawings.

DETAILED DESCRIPTION OF THE INVENTION

An embodiment of the present invention will be described below in detail with reference to the accompanying drawings.

Figure 1:
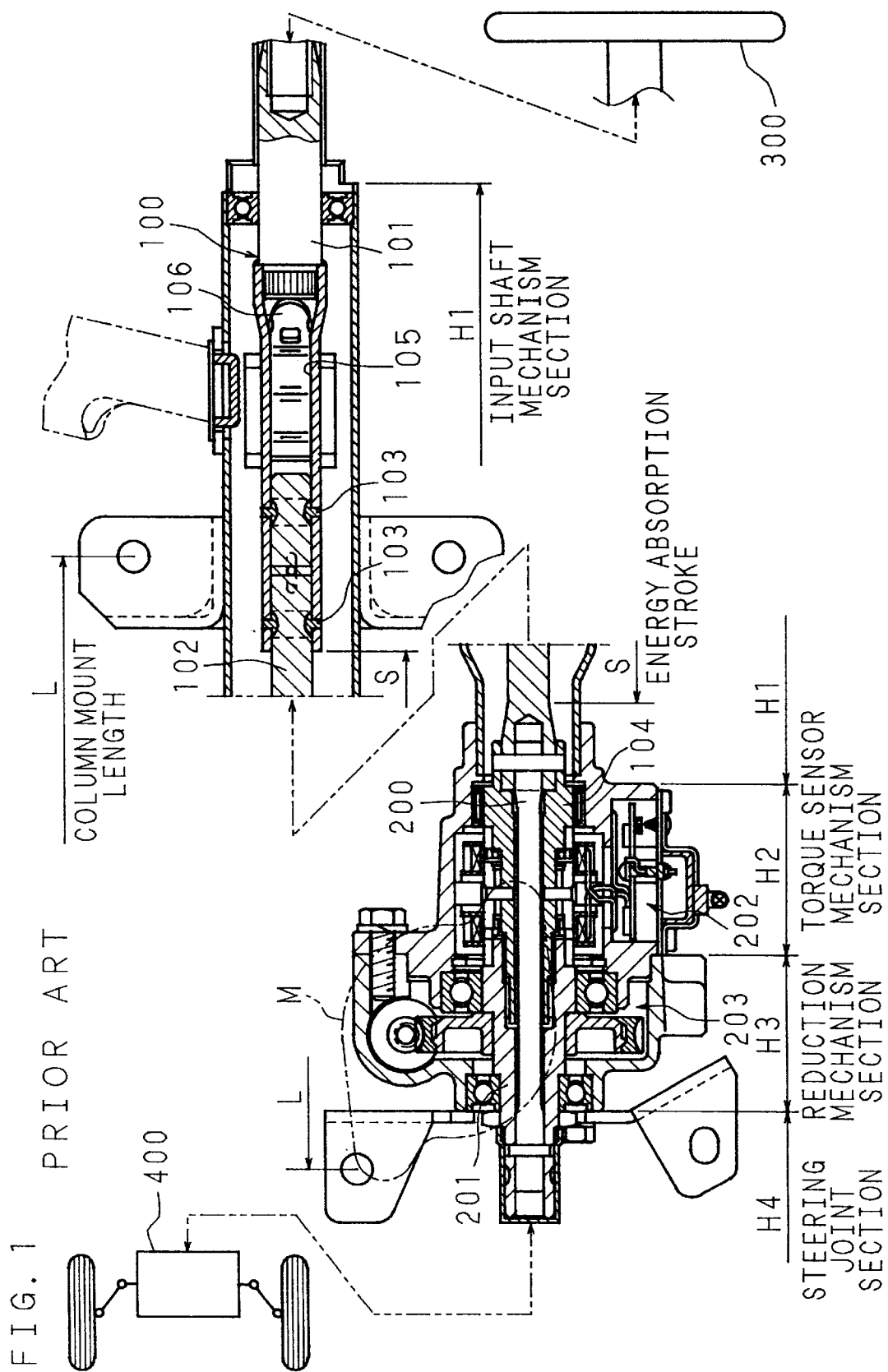
FIG. 1 is a cross-sectional view showing a conventional electric power steering apparatus.
Figure 2:
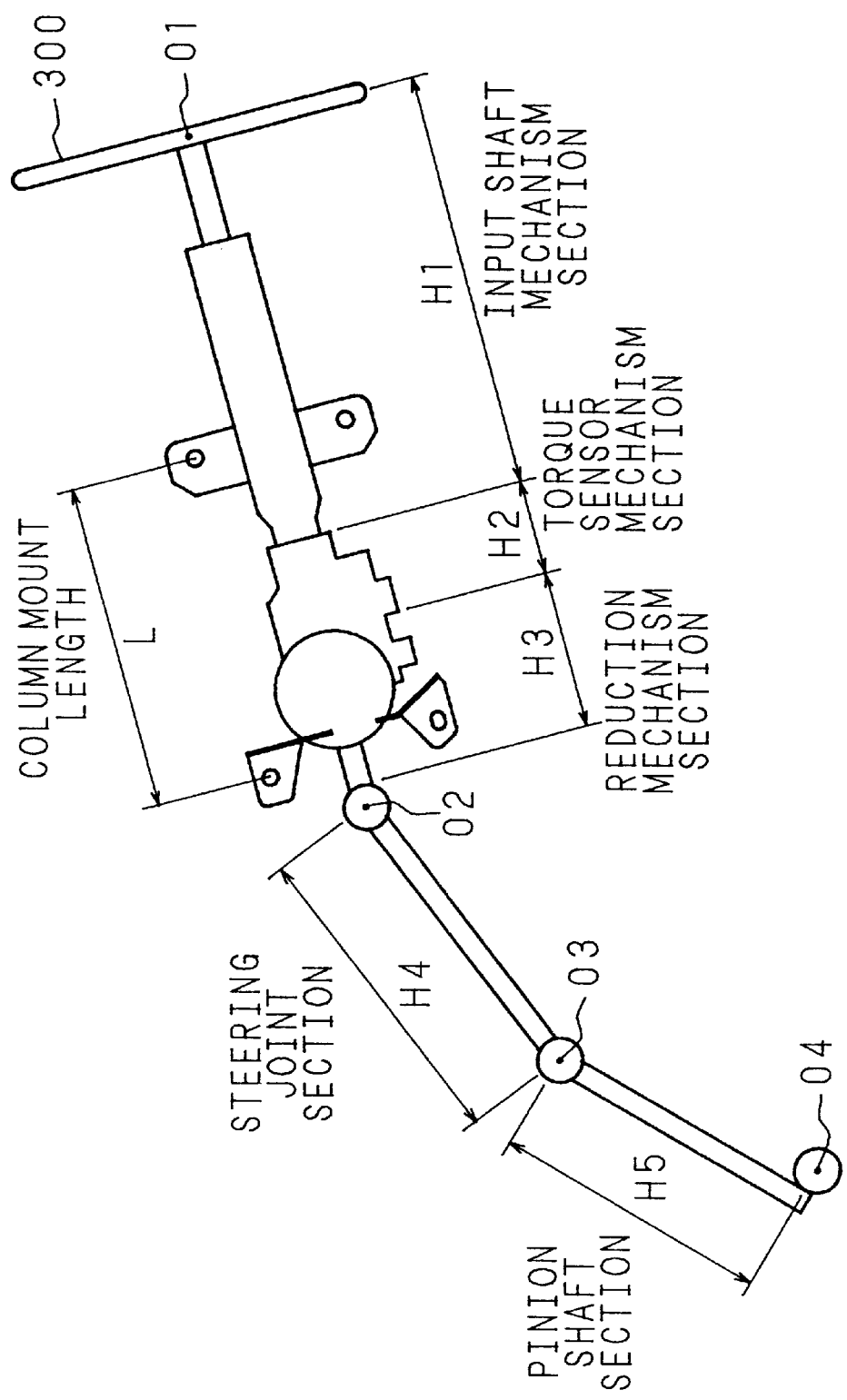
FIG. 2 is a view to explain a layout configuration of the conventional electric power steering apparatus.
Figure 3:
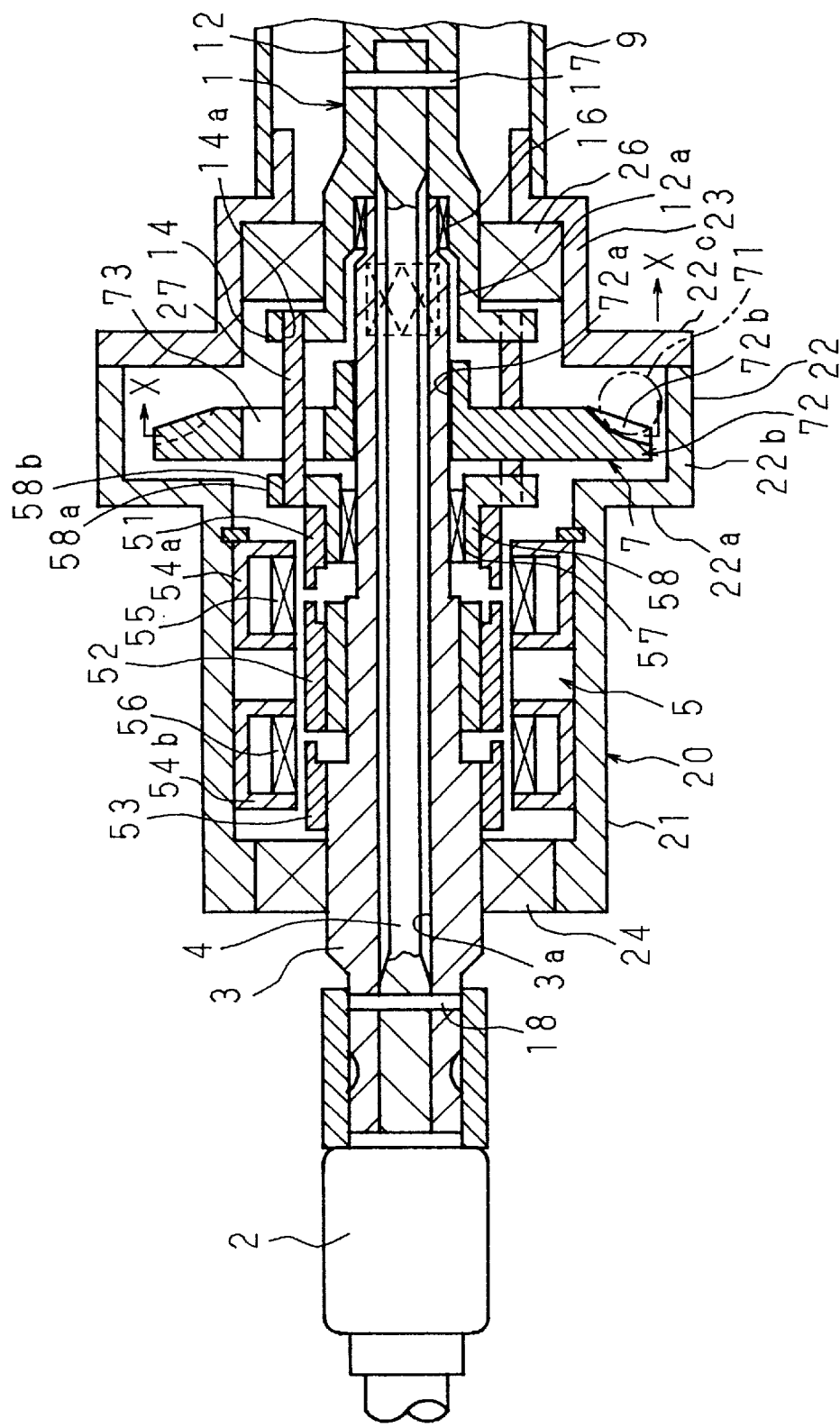
FIG. 3 is a cross sectional view showing principal parts of an electric power steering apparatus according to the present invention.
Figure 4:
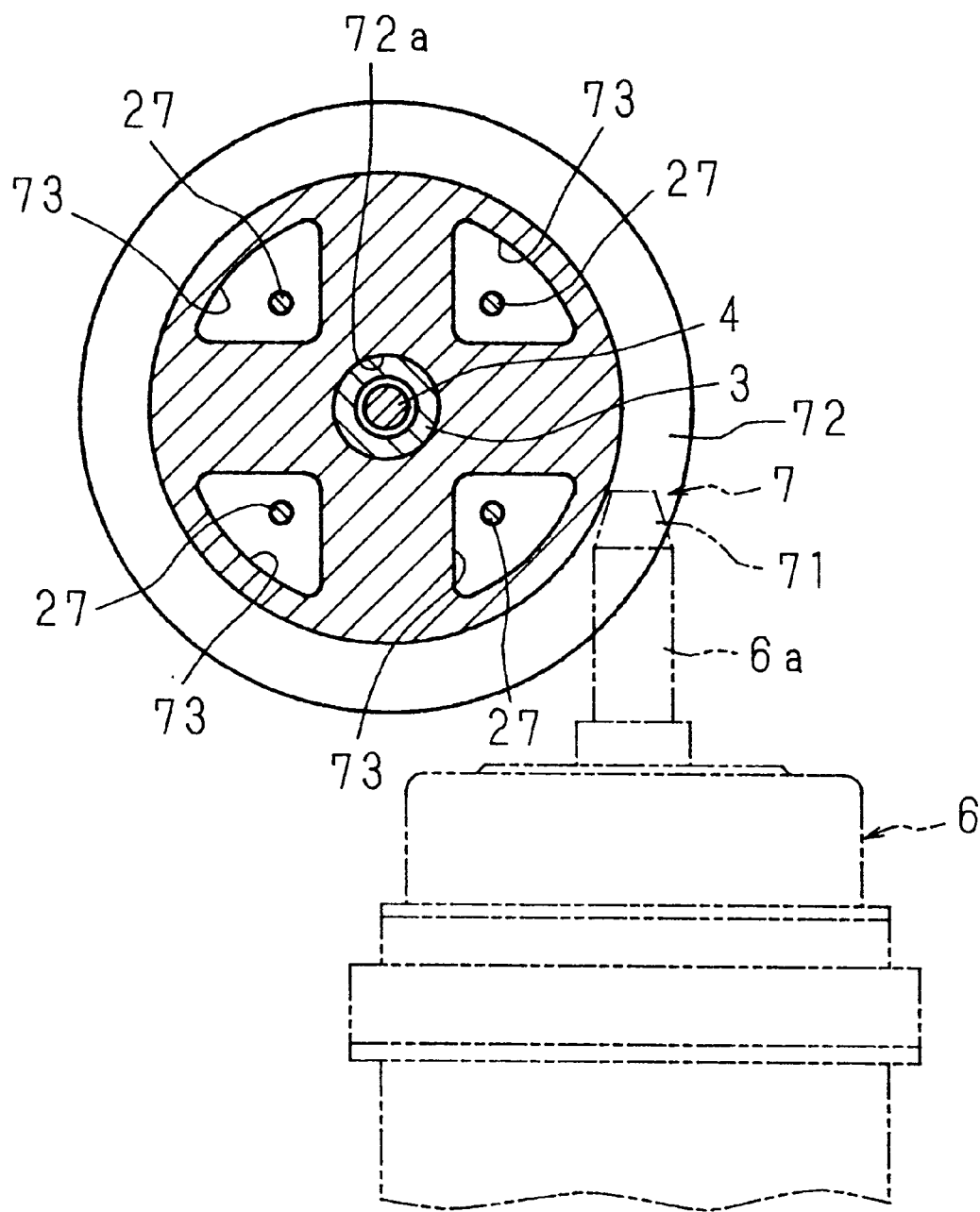
FIG. 4 is a cross-sectional view as taken along a line X—X of FIG. 3.
Figure 5:
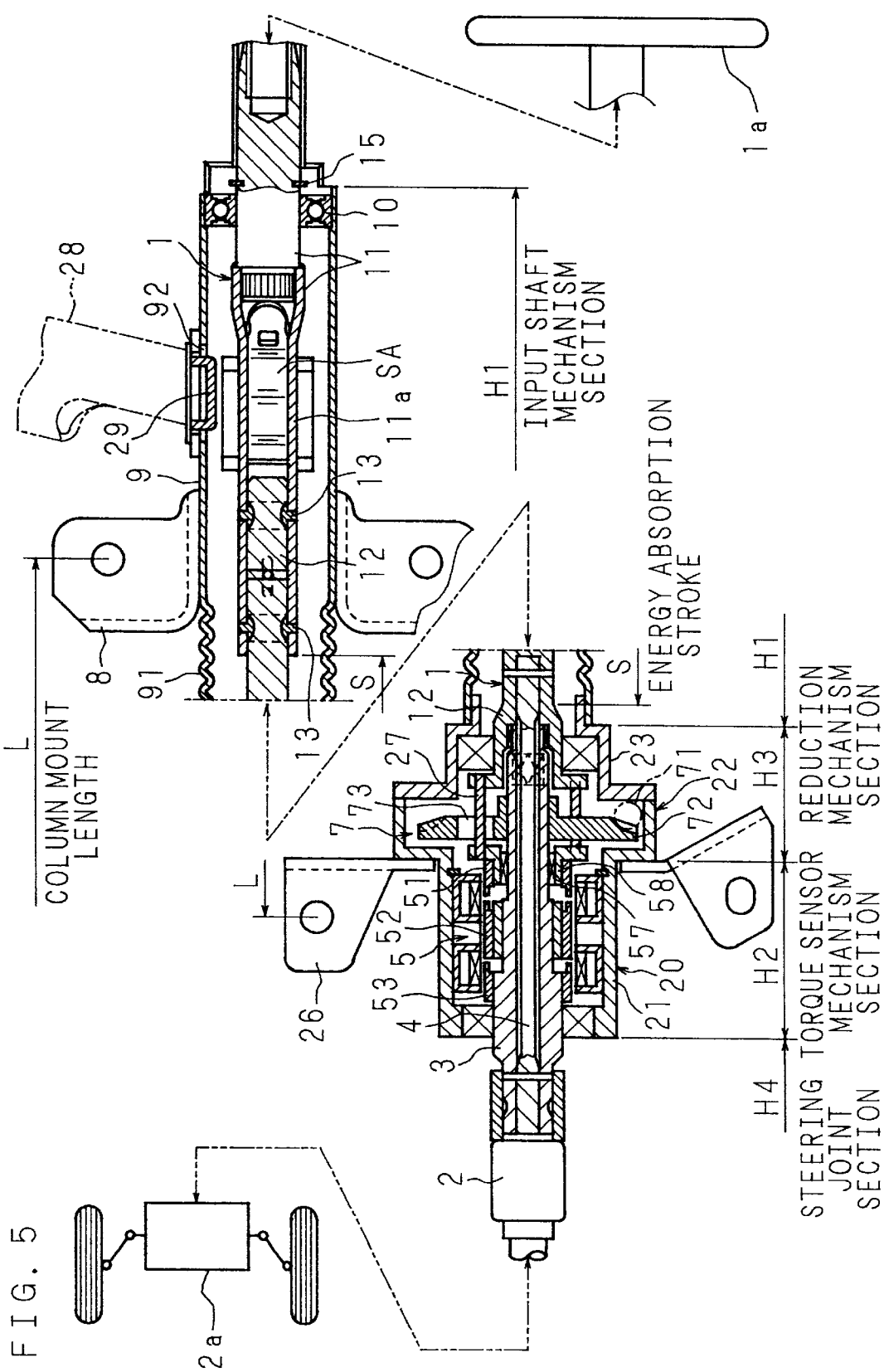
FIG. 5 is a cross-sectional view showing the whole configuration of the electric power steering apparatus according to the present invention.

FIG. 3 is a cross-sectional view showing principal parts of an electric power steering apparatus according to the present invention, FIG. 4 is a cross-sectional view as taken along a line X—X of FIG. 3, and FIG. 5 is a cross-sectional view showing the whole configuration of the electric power steering apparatus according to one embodiment of the present invention.

As shown in FIGS. 3, 4 and 5, the electric power steering apparatus includes an input shaft 1, a steering mechanism 2a, a cylindrical output shaft 3, a torsion bar 4, a torque sensor 5, a steering assisting electric motor 6 (hereinafter, referred simply to as "motor 6") and a reduction mechanism 7.

The input shaft 1 is connected to a steering wheel 1a for steering. The steering mechanism 2a has a rack shaft extending in right and left direction at the front side of a vehicle body and a pinion which meshes with a intermediate portion of the rack shaft. The out put shaft 3 is connected to the input shaft 1 via a pinion shaft in which the pinion is formed and via a steering joint 2. The torsion bar 4 coaxially connects these input shaft 1 and output shaft 3, and is twisted by a steering torque applied to the steering wheel 1a. The torque sensor 5 detects a steering torque on the basis of a relative displacement of the input shaft 1 and the output shaft 3 in response to a twist of the torsion bar 4. The motor 6 is driven on the basis of a detected result of the torque sensor 5, and the reduction mechanism 7 transmits a rotation of the motor 6 to the output shaft 3.

Further, the input shaft 1 includes a first input shaft 11, a second input shaft 12 and two shearing pins 13 and 13 which are made of a synthetic resin. The first input shaft 11 one end portion connected to the steering wheel 1a, and a fitting cylindrical portion 11a at the other end portion thereof. The second input shaft 12 has one end portion which is fitted into the fitting cylindrical portion 11a so as to be slidable, and the other end portion connected to the torsion bar 4. The shearing pins 13 and 13 are provided between the fitting cylindrical portion 11a and the second input shaft 12, and are raptured by an axial impact energy generated when a driver hits on the steering wheel 1a by a frontal (head-on) collision of automobiles.

Moreover, the fitting cylindrical portion 11a is provided with a metallic plate 14 which is bent into a wave form, at the bottommost portion thereof. The shearing pins 13 and 13 are raptured, and thereafter, when the first input shaft 11 slides, the metallic plate 14 is plastically deformed so that an impact energy acting on the first input shaft 11 can be absorbed.

Moreover, an outside of the input shaft 1 is fitted with a cylindrical shaft housing 9 which is supported so as to be slidable in a axial direction, via a first mount bracket 8 mounted to a vehicle body. The intermediate portion of the first input shaft 11 is supported on one end portion of the shaft housing 9 via a bearing 10.

The other end portion of the second input shaft 12 is formed with a bottomed cylindrical fitting recess portion 12a. One end portion of the output shaft 3 is fitted and supported on the fitting recess portion 12a so as to be rotatably via a bearing 16, and further, one end portion of the torsion bar 4 is fitted therein, and thus, these output shaft 3 and torsion bar 4 are connected by means of a dowel pin 17.

The output shaft 3 is formed into a cylindrical shape, and the torsion bar 4 is inserted through a shaft hole 3a of the output shaft 3, and thus, the other end portion of the torsion bar 4 is connected by means of a dowel pin 18.

The reduction mechanism 7 includes a small-diameter gear 71 which is formed integrally with an end portion of a driving shaft 6a of the motor 6, and a disk-shaped large-diameter gear 72 having a shaft hole 72a fitted in an outer periphery on the intermediate portion of the output shaft 3 and an outer circumferential gear tooth portion 72b. Further, the reduction mechanism 7 reduces a rotation of the motor 6, and then, transmits it to the output shaft 3.

As shown in FIG. 3, the torque sensor 5 is arranged to the steering mechanism 2a side (side opposite to the steering wheel 1a) from the reduction mechanism 7. Further, the torque sensor 5 is supported on the outer periphery on the intermediate portion of the output shaft 3 so as to be rotatable. Further, the torque sensor 5 includes a first detection ring 51, a second detection ring 52, a third detection ring 53, a torque detection coil 55 and a temperature compensation coil 56. The first detection ring 51 is cooperative with the input shaft 1 via an input transmission member 27 which will be described later. The second and third detection rings 52 and 53 are fixedly fitted on the outer periphery of the intermediate portion of the output shaft 3. The torque detection coil 55 and the temperature compensation coil 56 are arranged outside these first to third detection rings 51 to 53, and are held in a sensor housing 21 which will be described later, via retaining cylinders 54a and 54b made of a magnetic material.

These first to third detection rings 51 to 53 are made of a magnetic material, and a plurality of rectangular gear tooth portions are formed along the circumferential direction at equal intervals at end sides where the first and second detection rings 51 and 52 face each other, and at an end side of the third detection ring 53 facing the second detection ring 52. The torque detection coil 55 and the temperature compensation coil 56 are connected to an oscillator.

And then, a magnetic flux generated by the torque detection coil 55, the retaining cylinder 54a, the first detection ring 51 and the second detection ring 52 constitutes a first magnetic circuit, and by a magnetic flux generated by the temperature compensation coil 56, the retaining cylinder 54b, the second detection ring 52 and the third detection ring 53 constitutes a second magnetic circuit.

Thus, in the case where a steering torque is applied to the steering wheel 1a and the torsion bar 4 twists, a change occurs in a facing area of the gear tooth portion of the first detection ring 51 and the gear tooth portion of the second detection ring 52. For this reason, an impedance of the torque detection coil 55 varies, and then, it is possible to a torque acted on the torsion bar 4 by a voltage outputted in accordance with the variation of the impedance.

Further, the first detection ring 51 is fixedly fitted in the outer periphery on a passive member 58 with a flange made of a non-magnetic material, supported rotatably on the output shaft 3 via a bearing 57.

A housing 20 covering the torque sensor 5 and the reduction mechanism 7 is arranged over the other end portion of the output shaft 3 from the other end portion of the second input shaft 12. The housing 20 comprises a sensor housing 21 which covers around the torque sensor 5, a gear housing 22 which covers around of the reduction mechanism 7, and a housing 23 which covers around the other end portion of the second input shaft 12.

The sensor housing 21 is formed into a cylindrical shape, and the retaining cylinders 54a and 54b are supported in an inner periphery of the sensor housing 21. Also, the intermediate portion of the output shaft 3 is supported on one end portion of the sensor housing 21 via a bearing 24.

The gear housing 22 is formed integrally with the other end portion of the sensor housing 21. Further, the gear housing 22 comprises a side wall 22a covering one side portion of the large-diameter gear 72, a circumferential wall portion 22b which is formed integrally with an edge portion of the side wall 22a and covers the outer peripheral portion of the large-diameter gear 72, and a side wall 22c which is formed integrally with one end portion of the housing 23 and covers the other side portion of the large-diameter gear 72. An end portion of the side wall 22c is removably connected to the circumferential wall portion 22b.

The circumferential wall portion 22b of the gear housing 22 is connected with the motor 6, and the small-diameter gear 71, which is formed integrally with the end portion of the driving shaft 6a of the motor 6, is projected into the gear housing 22 from the circumferential wall portion 22b. Also, a second mount bracket 26 mounted to the vehicle body is removably attached to the side wall 22a by means of mounting means such as a screw.

The other end portion of the shaft housing 9 is fitted into the outer periphery on the other end portion of the housing 23; on the other hand, the other end portion of the second input shaft 12 is rotatably supported on the inner periphery on the intermediate portion of the housing 23 via a bearing 30.

Four metallic or hard synthetic resin rods are used as the input transmission member 27. The rotation of the input shaft 1 is transmitted to the first detection ring 51 via each input transmission member 27 in the following manner. More specifically, four insertion holes 73 penetrating in the thickness direction are provided on the intermediate portion between a shaft hole 72a of the large-diameter gear 72 and an outer peripheral gear tooth portion 72b thereof in the circumferential direction at equal intervals. The respective input transmission members 27 are inserted into these insertion holes 73, and further, one end portion of the respective input transmission members 27 is inserted into each of four holes 19a formed in a flange portion 19 which projects outwardly to a diameter direction from the other end portion of the second input shaft 12, and then, are cooperative; meanwhile the other end portion of the respective input transmission members 27 are inserted into each of each of four fitting holes 58b formed in a flange portion 58a of a passive member 58 with a flange, and then, are cooperative.

As shown in FIG. 5, the other end portion side of the shaft housing 9 is provided with a substantially bellows-like impact energy absorbing portion 91. When the first input shaft 11 slides by the breakage of the shearing pins 13 and 13, a stopper ring 15, which is provided on the intermediate portion of the first input shaft 11, abuts against the bearing 10, and then, an impact energy acts on the shaft housing 9 via these stopper ring 15 and bearing 10. Whereupon the impact energy plastically deforms the impact energy absorbing portion 91, and thereby, the impact energy can be absorbed.

As described above, the electric power steering apparatus is constructed in a manner that the torque sensor 5 is arranged to the steering mechanism 2a side from the reduction mechanism 7. The electric power steering apparatus is mounted to the vehicle body by means of the first and second mount brackets 8 and 26.

The following layout configuration is made. More specifically, the input shaft mechanism section H1 including the input shaft 1 and the reduction mechanism section H3 including the motor 6 and the reduction mechanism 7 are arranged between these first and second mount brackets 8 and 26. Moreover, the torque sensor mechanism section H2 including the torque sensor 5 and the steering joint section H4 are arranged outside the mount brackets 8 and 26, that is, to the steering mechanism 2a side from the reduction mechanism section H3.

Thus, a column mount length L between the first and second mount brackets 8 and 26 has no change according to user's instruction and requirement; nevertheless, it is possible to make long the length of the input shaft mechanism section H1 by a length equivalent to the longitudinal length of the conventional torque sensor mechanism section H2 in which the torque sensor mechanism section H2 is arranged to the steering wheel 1a side from the reduction mechanism section H3. Therefore, a collision safety performance can be further improved.

More specifically, in the conventional system layout, the torque sensor mechanism section H2 is arranged to the steering wheel 1a side from the reduction mechanism 7. In other words, the torque sensor mechanism section H2 is arranged within the column mount length L. On the contrary, in the system layout of the present invention, as described above, the torque sensor mechanism section H2 is arranged to the steering mechanism 2a side from the reduction mechanism 7 so as to be provided outside the column mount length L. Whereby it is possible to use the longitudinal length of the conventional torque sensor mechanism section H2 as the longitudinal length of the input shaft mechanism section H1, and it is possible to further make long the energy absorption stroke S in accordance with user's requirement. Therefore, a collision safety performance can be further improved.

Moreover, the large-diameter gear 72 of the reduction mechanism 7 is provided with the insertion hole 73, and the rotation of the input shaft 1 is transmitted to the first detection ring 51 of the torque sensor 5 via the input transmission member 27 inserted through the insertion hole 73. Thus, the layout configuration is made in a manner that the torque sensor 5 is arranged to the steering mechanism 2a side from the reduction mechanism 7; nevertheless, the conventional torque sensor 5 can be used; therefore, the system can be constructed at less cost.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

I claim:

1. An electric power steering apparatus, comprising:
    an input shaft connected to receive a steering force applied by an operator;
    an output shaft connected to said input shaft;
    a torsion bar interposed between said input shaft and said output shaft;
    a torque sensor mechanism having a torque sensor which detects a steering torque on the basis of a relative displacement of said input shaft and said output shaft;
    an electric motor for steering assistance being driven on the basis of a result detected by said torque sensor;
    a reduction mechanism for reducing a rotation of said electric motor and transmitting it to said output shaft; and
    a steering mechanism, connected to said output shaft, for performing steering so that steering operation is assisted by a rotational force of said output shaft,
    said torque sensor mechanism being positioned further from said input shaft 3 than is said reduction mechanism.

2. An electric power steering apparatus, comprising:
    an input shaft connected to receive a steering force applied by an operator,
    an output shaft connected to said input shaft;
    a torsion bar interposed between said input shaft and said output shaft;
    a torque sensor mechanism having a torque sensor which detects a steering torque on the basis of a relative displacement of said input shaft and said output shaft;
    an electric motor for steering assistance being driven on the basis of a result detected by said torque sensor;
    a reduction mechanism for reducing a rotation of said electric motor and transmitting it to said output shaft; and
    a steering mechanism, connected to said output shaft, for performing steering so that steering operation is assisted by a rotational force of said output shaft,
    said torque sensor mechanism being positioned closer to said steering mechanism than is said reduction mechanism;
    the electric power steering apparatus according to claim 1, wherein said reduction mechanism includes:
    a gear provided on said output shaft, having an insertion hole penetrating in the thickness direction thereof; and
    an input transmission member inserted into said insertion hole of said gear so as to transmit a rotation of said input shaft to said torque sensor.

3. An electric power steering apparatus, comprising:
    an input shaft connected to receive a steering force applied by an operator;
    an output shaft connected to said input shaft;
    a torsion bar interposed between said input shaft and said output shaft;
    a torque sensor mechanism having a torque sensor which detects a steering torque on the basis of a relative displacement of said input shaft and said output shaft;
    an electric motor for steering assistance being driven on the basis of a result detected by said torque sensor;
    a reduction mechanism for reducing a rotation of said electric motor and transmitting it to said output shaft; and
    a steering mechanism, connected to said output shaft, for performing steering so that steering operation is assisted by a rotational force of said output shaft,
    said torque sensor mechanism being positioned closer to said steering mechanism than is said reduction mechanism;
    The electric power steering apparatus according to claim 1, wherein said reduction mechanism includes:
    a disk-shaped gear, provided on said output shaft, having a plurality of insertion holes penetrating in the thickness direction thereof and formed along a circumferential direction at equal intervals; and
    a plurality of input transmitting rods, inserted into said insertion holes of said gear, connecting said input shaft and said torque sensor.

4. The electric power steering apparatus according to claim 2, wherein said reduction mechanism includes:
    a pinion gear, connected to an output shaft of said electric motor, meshed with said gear.

5. The electric power steering apparatus according to claim 3, wherein said reduction mechanism includes:
    a pinion gear, connected to an output shaft of said electric motor, meshed with said gear.

* * * * *